United States Patent [19]

Seibert et al.

[11] 4,086,054
[45] Apr. 25, 1978

[54] CONCENTRATED STORAGE-STABLE SOLUTIONS OF ALKYLBENZENESULFONATES OF BASIC DYES

[75] Inventors: Walter Seibert, Ludwigshafen; Guenther Riedel, Heidelberg-Wieblingen; Kurt Mayer, Ludwigshafen, all of Germany

[73] Assignee: BASF Aktiengesellschaft, Ludwigshafen, Germany

[21] Appl. No.: 634,455

[22] Filed: Nov. 24, 1975

Related U.S. Application Data

[63] Continuation-in-part of Ser. No. 482,136, Jun. 24, 1974, abandoned.

[30] Foreign Application Priority Data

Jun. 27, 1973   Germany ............................ 2332540

[51] Int. Cl.$^2$ .................... C09B 67/00; D06P 1/62

[52] U.S. Cl. ......................................... 8/89 R; 8/173; 8/177 AB

[58] Field of Search ...................... 8/89, 173, 177 AB

[56] References Cited

U.S. PATENT DOCUMENTS

| | | | |
|---|---|---|---|
| 1,841,876 | 1/1932 | Buc ................................................ 8/6 |
| 3,718,428 | 2/1973 | Streck ...................................... 8/173 |

OTHER PUBLICATIONS

Rose, The Cond. Chem. Dict., Seventh Ed., 1966, Reinhold Publ. Co., p. 953.

*Primary Examiner*—William E. Schulz
*Attorney, Agent, or Firm*—Keil, Thompson & Shurtleff

[57] ABSTRACT

Concentrated, storage-stable solutions of alkylbenzenesulfonates, with alkyl chains of 8 to 18 carbon atoms, of basic dyes, in normally liquid alcohols, glycols and glycol ethers. The solutions are particularly suitable for producing waterfast prints, colorations, script and markings.

7 Claims, No Drawings

CONCENTRATED STORAGE-STABLE SOLUTIONS OF ALKYLBENZENESULFONATES OF BASIC DYES

This application is a continuation-in-part of our co-pending application Ser. No. 482,136, filed June 24, 1974, now abandoned.

The invention relates to concentrated, storage-stable solutions of alkylbenzenesulfonates of basic dyes in alcohols, glycols and glycol ethers which are liquid at room temperature.

The basic dye powders hitherto available are of limited solubility and therefore in general do not permit the production of highly concentrated and stable solutions in organic solvents. Commercial dye salts are generally the chlorides of basic dyes, which have limited solubility in, for example, the solvents suitable for flexographic inks, such as alcohols, glycols and glycol ethers. As a rule, storage-stable dye solutions wherein the dye concentration exceeds 10 to 15 percent by weight cannot be produced. Furthermore, the storage of such solutions results in severe corrosion of the storage vessels and of the machines on which the solutions are used.

To eliminate these disadvantages it has been proposed to react the basic dyes with dyes, containing sulfo groups or carboxyl groups, of the azo, triphenylmethane or xanthene series, in glycols or their ethers (German Pat. No. 1,298,657). This produces concentrates in glycols and glycol ethers, but alcohols, such as methanol, ethanol, propanol and butanol, cannot be used because of the low solubility of these products. However, numerous applications, especially the manufacture of flexographic inks, require products which can be dissolved, at high concentrations, in the common alcohols.

We have now found that alkylbenzenesulfonates, with alkyl chains of 8 to 18 carbon atoms, of basic dyes give solutions of high concentrations, that is to say of up to 75 percent by weight based on the solution, in alcohols, glycols and/or glycol ethers which are liquid at room temperature. Such solutions are outstandingly stable in storage and do not cause corrosion of apparatuses, containers and equipment when they are used. They are outstandingly suitable for the production of printing inks, especially flexographic inks, rubber-stamp inks, writing inks, ball-pen fluids, transparent surface coatings and timber stains.

Examples of basic dyes which can be used in the solutions according to the invention are diarylmethane dyes, triarylmethane dyes, xanthene dyes and basic dyes from the azo, methine, azomethine, diazopolymethine, acridine, safranine, induline, nigrosine and oxazine series, or their mixtures. The following may be mentioned as individual examples: auramine (Basic Yellow 2), rhodamine 6 G (C.I. Basic Red 1), rhodamine B (C.I. Basic Violet 10), Victoria Blue B (C.I. Basic Blue 26), Victoria Pure Blue B (Basic Blue 7), Rhodulin Blue 6 G (C.I. Basic Blue 1), Methyl Violet (C.I. Basic Violet 1), Crystal Violet (C.I. Basic Violet 3), Diamond Green (C.I. Basic Green 1) and Malachite Green (C.I. Basic Green 4) as well as phenazine dyes, such as C.I. Solvent Blue 7 and C.I. Solvent Black 7.

Further dyes are C.I. 11021, C.I. 11270, C.I. 42563 and the dyes of the formulae:

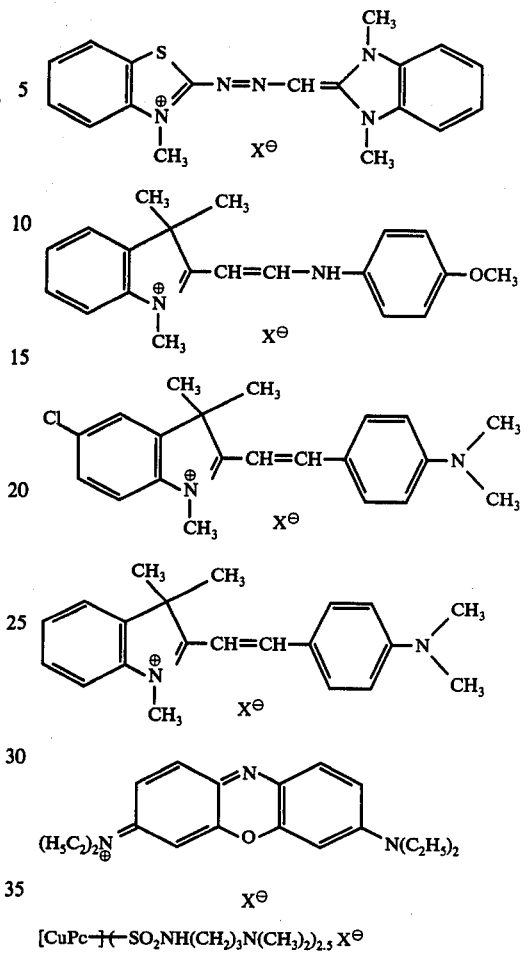

The commercial alkylbenzenesulfonic acids or alkylbenzenesulfonates are industrially important starting materials for the alkylbenzenesulfonate component. In the majority of cases, they contain one sulfonate group on the aromatic nucleus. The following should be mentioned as examples: n-octylbenzenesulfonic acid, n-nonylbenzenesulfonic acid, n-dodecylbenzenesulfonic acid, n-tetradecylbenzenesulfonic acid, n-hexadecylbenzenesulfonic acid, n-octadecylbenzenesulfonic acid, 2-ethyl-hexylbenzenesulfonic acid, 2-butyl-octylbenzenesulfonic acid, 2-amyl-nonylbenzenesulfonic acid, 2-propyl-heptylbenzenesulfonic acid an the corresponding sulfonates. Alkylbenzenesulfonic acids and alkylbenzenesulfonates which are used, as a mixture with an average of 12 carbon atoms in the alkyl chain — unbranched alkyl chains being preferred — for the production of detergents are particularly suitable.

The alkylbenzenesulfonates of the basic dyes can be produced by reacting the dye bases concerned with the alkylbenzenesulfonic acids or by reacting the dye salts, preferably with the sodium salts of the alkylbenzenesulfonic acids. The reaction is suitable carried out in the conventional solvents for such reactions. Where the salts are used in the reaction, aqueous mineral acids are used advantageously as solvents. The reaction products can be separated from the solvents by conventional methods and be dissolved in the alcohols, glycols or glycol ethers or mixtures of these, to produce the solutions according to the invention; methanol, ethanol, isopropanol, butanol, diacetone alcohol, ethylene glycol, ethylene glycol monomethyl ether and monoethyl ether, dipropylene glycol, ethyldiglycol, butyldiglycol, benzyl alcohol, phenylglycol and higher-boiling compounds of these categories which are liquid at room temperature are particularly suitable for this application. Ethanol, isopropanol, benzyl alcohol, ethylglycol, ethyldiglycol and mixtures of these solvents are particularly preferred. The solution can be prepared a room temperature or at elevated temperature, for example 50° to 90° C.

The reaction of the basic dyes or their salts with the alkylbenzenesulfonic acids and the production of the soltuions according to the invention can, however, also be carried out in one step by reacting the components directly in the alcohol, glycol or glycol ether or their mixtures. A particularly advantageous embodiment is, for example, to bring the dye base and alkylbenzenefulfonic acid together in solution in ethanol and ensure that equivalent amounts are present in potentiometric titration until there is an abrupt change in the potential.

With dye bases and salts of a defined molecular weight, the amounts to be reacted can easily be calculated, since the reaction takes place in the ratio of 1 mole of dye base to, suitably, 0.8 to 1.5 moles of alkylbenzenesulfonate.

When reacting dye salts with alkali metal alkylbenzenesulfonates in water in the presence of an acid, the water is preferably removed under reduced pressure after the reaction has taken place, that is to say after the alkylbenzenesulfonic acid salt of the dye base has formed. The dye salts formed are insoluble or only sparingly in water but are readily soluble in the binder solutions conventionally used for the production of the printing inks and transparent surface coatings, these solutions in turn also being practically insoluble in water. The concentration selected for industrial use is 20 to 75, preferably 40 to 70, percent by weight of dye salt, based on the solution.

Water-fast prints, colorations, script and markings can be produced particularly advantageously with the solutions according to the invention, containing the alkylbenzenesulfonates of basic dyes as colorants; the solutions are particularly convenient to handle. For example, relatively little, if any, so-called laking agents are needed when producing flexographic inks. The concentrated dye salt solutions according to the invention can be used by conventional methods.

The parts and percentages mentioned in the Examples which follow are by weight.

EXAMPLE 1

35 Parts of auramine base (C.I. Solvent Yellow 34) and 35 parts of alkylbenzenesulfonic acid with an average of 12 carbon atoms in the alkyl radical are heated to 60° C in 30 parts of a mixture of ethanol/ethylglycol (1:1), whilst stirring, until a clear solution has been produced. A concentrate of pH 6.5, which has good flow and is stable on storage, is obtained; it can be used for the production of yellow flexographic inks.

To produce a flexographic ink, 20 parts of the concentrate are mixed with 80 parts of a solution of 16 parts of shellac flake and 64 parts of a mixture of ethanol/ethylglycol (9:1). This printing ink is applied by means of a spiral doctor onto imitation parchment paper, to give a wet film thickness of 24 micrometers. The fastness to water, as determined according to DIN 16,524, of the film obtained is markedly better than when using a printing ink which contains 5 parts of auramine nitrate in 100 parts of the above shellac solution. To achieve the same fastness to water, 10 parts of tannin must be added when using auramine nitrate.

EXAMPLE 2

151.5 Parts of auramine (C.I. Basic Yellow 2), 1,000 parts of water, 170 parts of technical-grade 78% strength sodium alkylbenzenesulfonate with an average of 12 carbon atoms in the alkyl radical and 500 parts of trichloroethylene are stirred for 3 hours at 40° C. The trichloroethylene layer is separated off and 207 parts of dipropylene glycol are added. The trichloroethylene and water are distilled off under reduced pressure at about 40° C. 414 parts of a liquid concentrate which contains 0.2% of water are obtained. This concentrate can be used for the production of ball-pen fluids and printing inks based on mineral oil/glycol.

EXAMPLE 3

421 Parts of alkylbenzenesulfonic acid with an average of 12 carbon atoms in the alkyl radical are run into a mixture of 1,113 parts of moist technical auramine base (C.I. Solvent Yellow 34) of 36% solids content and 1,200 parts of trichloroethylene at from 25° to 30° C, whilst stirring. At the end of the addition, the aqueous layer has a pH of 5.1. The trichloroethylene layer is separated off, 300 parts of dipropyleneglycol are added and trichloroethylene and water are then distilled off under reduced pressure at 40° to 50° C. 1,067 parts of a liquid concentrate containing 0.1% of water are obtained.

EXAMPLE 4

40 Parts of rhodamine base B (C.I. Solvent Red 49) and 26 parts of alkylbenzenesulfonic acid as used in Example 1 are dissolved in a mixture of 17 parts of ethanol (99% strength) and 17 parts of ethylglycol at 90° C. A concentrate of pH 5.6 is obtained; this had good flow, is stable even after 2 weeks' storage at −18° C and can be used for the production of red flexographic inks. For this purpose, 15 parts of the concentrate are mixed with 85 parts of a 20% strength solution of shellac in ethanol. The fastness to water of a film of printing ink, tested according to DIN 16,524, is superior to that of a corresponding printing ink with 6 parts of rhodamine B (C.I. Basic Violet 10) and 12 parts of tannin in 82 parts of a 20% strength shellac solution.

EXAMPLE 5

30 Parts of Victoria Blue Base B (C.I. Solvent Blue 4) and 20 parts of n-hexadecylbenzenesulfonic acid are dissolved in a mixture of 25 parts of ethanol and 25 parts of ethylglycol at 90° C. The concentrate, which is fluid and storage-stable, can be used to produce flexographic inks.

EXAMPLE 6

207 Parts of Victoria Blue B (C.I. Basic Blue 26), 400 parts of a 78% strength sodium alkylbenzenesulfonate according to Example 2 and 750 parts of water are stirred at 80° C for 7½ hours. After setting out overnight, the colorless aqueous layer is decanted. The residue is stirred with 500 parts of water and 500 parts of trichloroethylene for 1 hour. The trichloroethylene layer is separated off and the bulk of the trichloroethylene and water are distilled off. 374 parts of a 1:1 benzyl alcohol/phenylglycol mixture are added and residual trichloroethylene and water are removed under reduced pressure at 60° C. 750 parts of a fluid blue concentrate which can be used for the production of ballpen fluids, are obtained. To produce the latter, 50 parts of this concentrate, 25 parts of a 1:1 mixture of benzyl alcohol and phenylglycol, 10 parts of C.I. Solvent Blue 64 and 15 parts of a phthalate resin based on a phthalic acid/hexanetriol ester are converted into a solution at 95° C.

EXAMPLE 7

30 Parts of rhodamine 6 G bicarbonate (according to German Pat. No. 1,769,078) and 16 parts of a 1:1 mixture of octylbenzenesulfonic acid and nonlybenzenesulfonic acid are dissolved in a mixture of 27 parts of ethanol and 27 parts of ethylglycol, with heating until the evolution of gas has ceased and a clear solution is obtained. The concentrate can be used to produce flexographic inks.

EXAMPLE 8

1,216 Parts of a ground nigrosin base (C.I. Solvent Black 7) are introduced into a mixture of 950 parts of ethanol, 950 parts of ethylglycol and 684 parts of alkylbenzenesulfonic acid as used in Example 1, and the charge is stirred at room temperature until complete solution has occurred. The concentrate obtained has a pH of 6.0 and can be used to produce black flexographic inks, felt-pen inks and timber stains.

To produce a flexographic ink, 20 parts of this concentrate are dissolved in 80 parts of a 20% strength shellac solution. When tested according to DIN 16,524, the ink gives water-fast prints even without added laking agents.

To produce a felt pen ink, 100 parts of concentrate are dissolved at room temperature in a mixture of 500 parts of ethanol, 300 parts of isopropanol and 100 parts of a copolymer of styrene and a maleic acid ester, conventionally used for the production of such inks.

EXAMPLE 9

170 Parts of a 78% strength sodium tetradecylsulfonate, 160 parts of 10% strength sulfuric acid and 1,000 parts of water are heated to 95° – 100° C. 90 parts of nigrosin base (as in EXample 8) are added whilst stirring. The reaction is complete after 5 hours. The almost colorless aqueous layer is separated off and the residue is extracted by stirring with 1,000 parts of water for 1 hour at from 95° to 100° C. The colorless wash water is separated off, 90 parts of ethylene glycol monoethyl ether are added to the residue, and the mixture is freed from water at 100° C under reduced pressure. 255 parts of a black concentrate suitable for the production of flexographic inks are obtained.

EXAMPLE 10

The amount of alkylbenzenesulfonic acid required for the reaction with bases is determined by the following method: 0.75 part of rhodamine base (C.I. Solvent Red 49) are dissolved in 150 parts of ethanol and titrated potentiometrically by addition of the alkylbenzenesulfonic acid mentioned in Example 1, as a 5% strength solution in ethanol. At the point that the potential change is abrupt, 13.7 ml of 5% strength alkylbenzenesulfonic acid solution have been consumed. This gives a ratio of 1 part of rhodamine B to 0.65 part of alkylbenzenesulfonic acid.

EXAMPLE 11

35 Parts of methyl violet base (Solvent Violet 8) and 25 parts of alkylbenzenesulfonic acid as described in Example 1 are dissolved at 65° C in 40 parts of a mixture of equal parts of isopropanol and toluene. The concentrate shows good flow, is stable in storage and lends itself to the production of intaglio printing inks containing toluene.

EXAMPLE 12

35 Parts Victoria Pure Blue Base FGA (Solvent Blue 81) and 20 parts of alkylbenzenesulfonic acid as described in Example 1 are dissolved at 23° C in 45 parts of a mixture of equal parts of isopropanol, toluene and methyl glycol. The concentrate is suitable for the manufacture of intaglio printing inks.

EXAMPLE 13

400 Parts of the zinc chloride double salt of malachite green (Basic Green 4) is suspended in 2000 parts of water and converted into the base by adding sodium carbonate. The base is extracted with 1400 parts of xylene. The solution containing xylene is treated with 161 parts of alkylbenzenesulfonic acid as described in Example 1 and stirred for 2 hours at 65° C. The supernatant xylene is decanted and the remaining paste stirred with 50 parts of ethanol and 50 parts of ethylglycol to make 595 parts of concentrate. The concentrate lends itself to the manufacture of flexographic inks. 15 parts of concentrate, 20 parts of shellac and 60 parts of ethanol give a flexogaphic ink having clearly superior water fastness to an ink of similar intensity based on a 1:1 mixture of Basic Green 1 and tannin.

EXAMPLE 14

60 Parts of crystal violet base (Solvent Violet 9) is run into a solution of 100 parts of isopropanol, ethanol and ethylglycol (1:1:1) and 40 parts of alkylbenzenesulfonic acid as described in Example 1, and heated for 3 hours at 50° C. 200 parts of a concentrate is obtained which is suitable for the manufacture of flexographic inks.

EXAMPLE 15

65 Parts of Basic Violet 15 is dissolved in 500 parts of water and converted into the base with aqueous ammonia. 60 parts of the isolated and dried base is run into a solution of 15 parts of ethanol, 50 parts of ethylglycol and 40 parts of alkylbenzenesulfonic acid as described in Example 1 and the whole stirred for 2 hours at 50° C. The homogeneous solution is cooled to room temperature and weighed. 200 parts of a red concentrate is obtained.

EXAMPLE 16

20 Parts of Solvent Yellow 56 (C.I. 11021) and 25 parts of alkylbenzenesulfonic acid as used in Example 1 are dissolved in 55 parts of ethylene glycol monoethyl ether at 95° C. A red solution is obtained which does not tend to precipitate crystals at a temperature of −20° C and is suitable for the manufacture of intaglio printing inks containing toluene.

If 55 parts of toluene are used instead of ethylene glycol monoethyl ether, a solution having similar properties is obtained.

EXAMPLE 17

30 Parts of the dye powder obtained by reacting Chrysoidine B (C.I. 11270) with alkylbenzenesulfonic acid as used in Example 1 in aqueous solution, precipitating and drying are dissolved at 80° to 90° C in 70 parts of a mixture of 1 part by volume of methanol and 1 part by volume of ethylene glycol monomethyl ether. The concentrate is unchanged after 2 weeks' storage at −20° C and shows no crystal formation. It is suitable for the manufacture of orange flexographic inks by dissolving 15 parts of concentrate and 15 parts of shellac in 70 parts of ethanol (only 1 part of Basic Orange 2 will dissolve in the said shellac solution).

EXAMPLE 18

(a) 20 Parts of a dye obtained by reacting 1 mole of copper phthalocyanine trisulfochloride with 3 moles of dimethylaminopropylamine are dissolved with 10 parts of dodecylbenzenesulfonic acid (97%) at 95° C in 45 parts of ethylene glycol monoethyl ether. The blue dye concentrate may be stored at temperatures below −10° C without crystallization. It is suitable for the manufacture of blue transparent coatings and timber stains.

(b) The concentrate may be used to prepare stable ball pen fluids.

EXAMPLE 19

30 Parts of Victoria Blue Base 4R (C.I. 42563) and 20 parts of dodecylbenzenesulfonic acid (97%) are dissolved in 50 parts of ethylene glycol monophenyl ether at 80° C.

A blue ball pen fluid is obtained by mixing 20 parts of the resultant solution with 60 parts of the solution described under 18(b) and 20 parts of a phthalic acid/hexanetriol ester and heating to 95° C.

EXAMPLE 20

35 Parts of Induline Base N (C.I. 50400) and 20 parts of dodecylbenzenesulfonic acid are dissolved while heating at 95° C in 45 parts of a mixture of 30 parts of ethanol and 15 parts of ethylene glycol monoethyl ether.

The concentrate is suitable for the manufacture of printing inks and felt pen fluids as described in Example 8.

EXAMPLE 21

120 Parts of the base prepared from the dyestuff of the formula

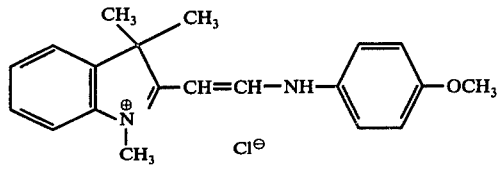

using water and ammonia are dried and then stirred with 80 parts of dodecylbenzenesulfonic acid in 200 parts of a mixture of ethanol/ethylene glycol monoethyl ether (1:1) for 12 hours at 23° C and heated for 10 minutes at 80° C. The yellow concentrate is suitable for the manufacture of printing inks and felt pen inks.

If the dye of the formula

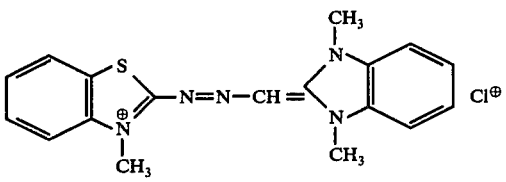

is used instead of the above dye, a similar solution is obtained which is eminently suitable for making flexographic inks.

We claim:

1. A concentrated storage-stable dye salt solution in an organic solvent, said solution consisting essentially of an alkylbenzenesulfonate salt, having an alkyl chain of 8 to 18 carbon atoms, of a basic dye, dissolved in an organic solvent selected from the group consisting of $C_1$ to $C_4$ alkanols, benzyl alcohol, ethylene glycol, propylene glycol, ethylene diglycol, propylene diglycol, ethylene triglycol, propylene triglycol, the phenyl or $C_1$ to $C_4$ alkyl monoethers of said glycols, acetone, methyl ethyl ketone, cyclohexanone, toluene and xylene or mixtures of said solvents, said solution containing from 20 to 75 percent by weight of said dye salt, based on the solution.

2. A dye salt solution as claimed in claim 1, wherein the content of dye salt is from 40 to 70 percent by weight, based on the solution.

3. A dye salt solution as claimed in claim 1, wherein the alkylbenzenesulfonate salt is a mixture of alkylbenzenesulfonates with an average of 12 carbon atoms in the alkyl chain.

4. A dye salt solution as claimed in claim 1, wherein the basic dye is selected from the group consisting of diarylmethane, triarylmethane, xanthene, phenazine, monoazo, azamethine, methine and copper phthalocyanine dyes.

5. A dye salt solution as claimed in claim 1, wherein the organic solvent is ethanol, isopropanol or benzyl alcohol.

6. A dye salt solution as claimed in claim 1, wherein the organic solvent is diethylene glycol, dipropylene glycol, methylglycol, ethylglycol, ethyldiglycol, propyl glycol, butyl glycol or phenylglycol.

7. A dye salt solution as claimed in claim 1, wherein toluene is the solvent.

* * * * *